Patented June 5, 1951

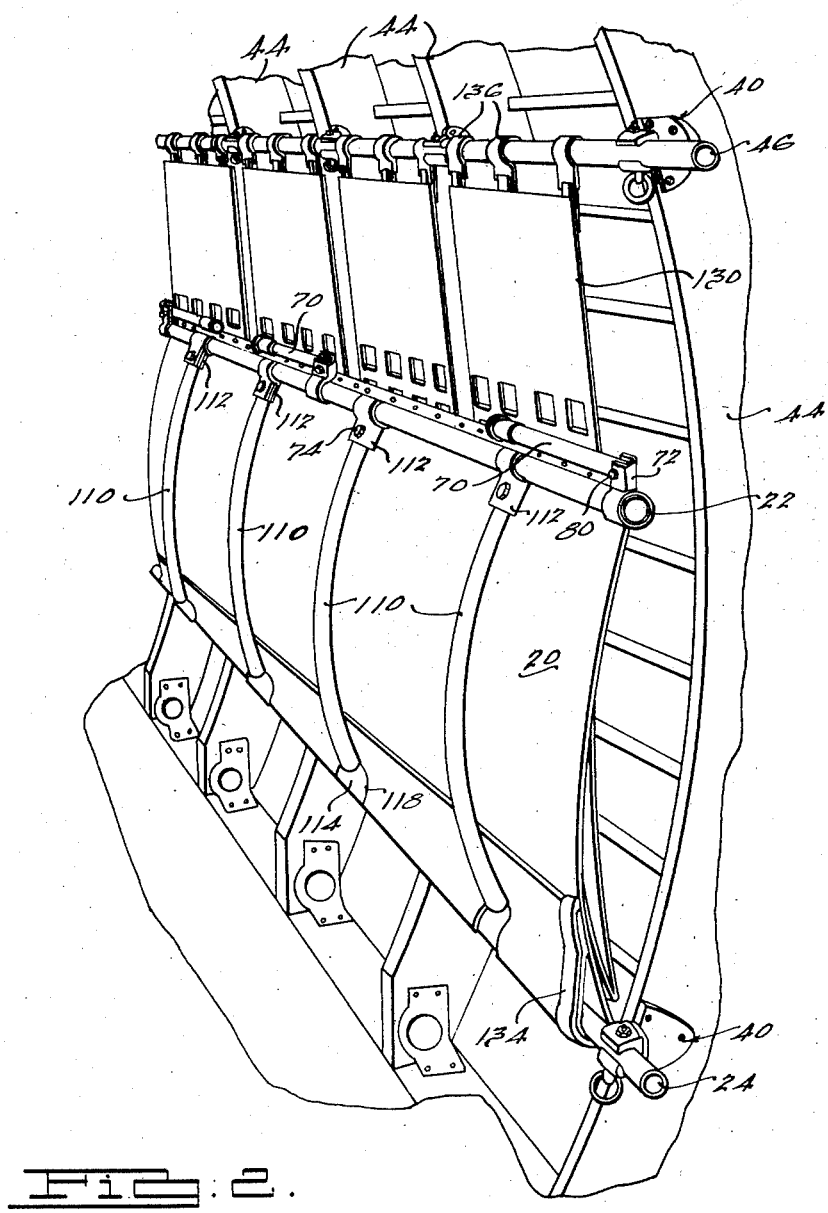

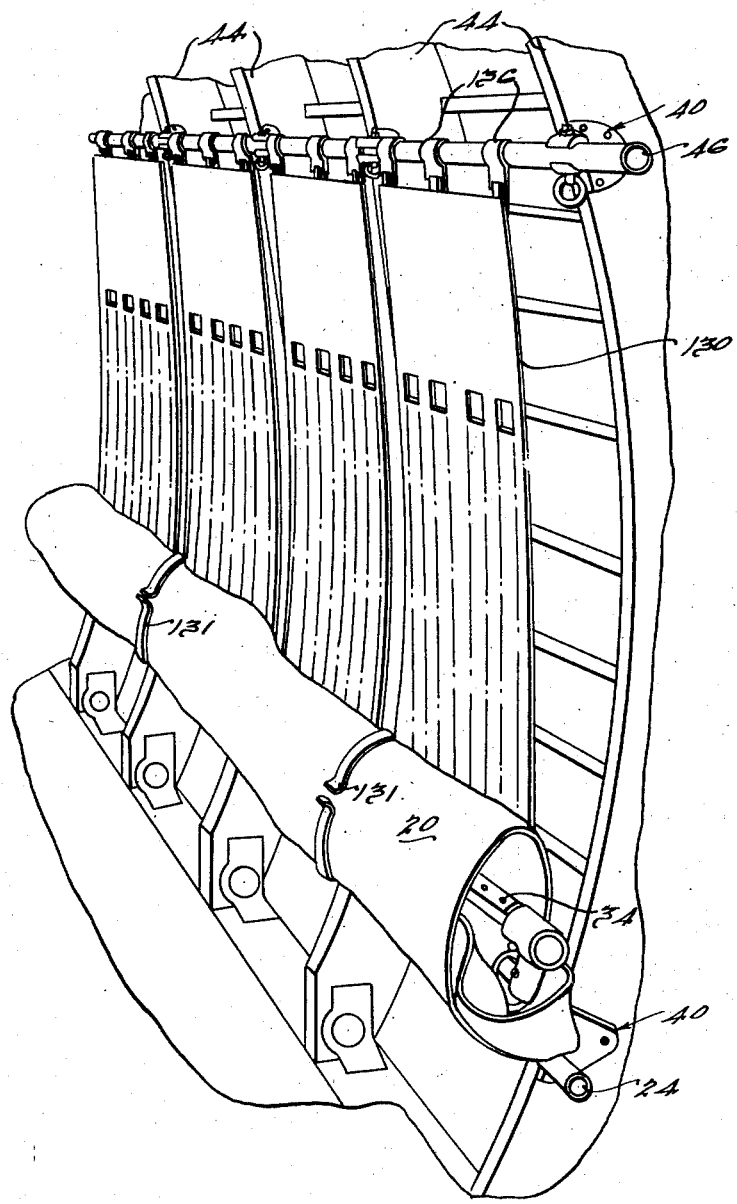

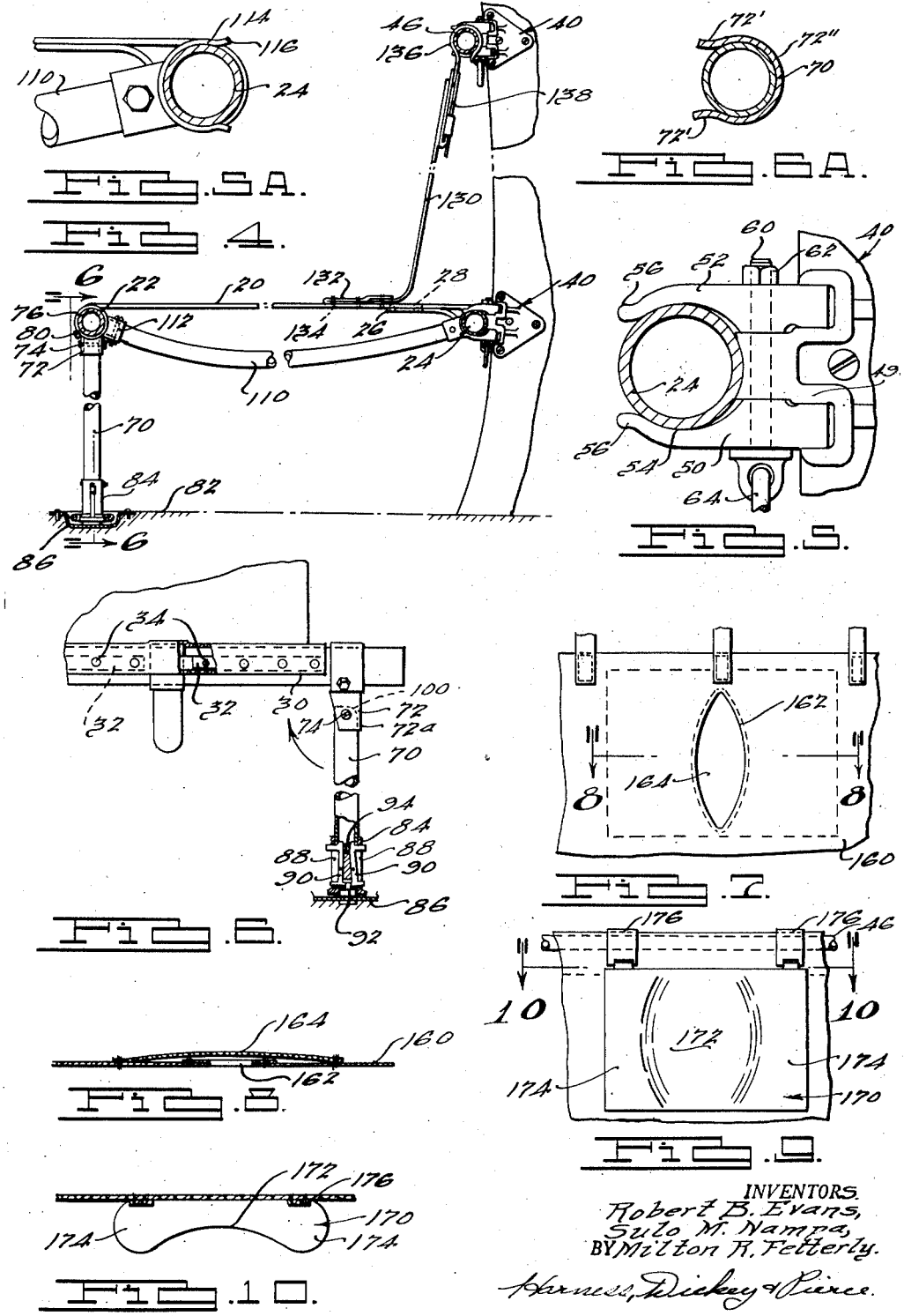

2,556,077

UNITED STATES PATENT OFFICE 2,556,077

COMBINATION SEAT AND BED

Robert B. Evans, Grosse Pointe Shores, Sulo Michael Nampa, Detroit, and Milton R. Fetterly, Trenton, Mich., assignors to Evans Products Company, Plymouth, Mich., a corporation of Delaware Application November 27, 1950, Serial No. 197,656

12 Claims. (Cl. 5—9)

The present invention relates to seat and bed constructions, and is particularly directed to the provision of improved constructions which can be convertibly used as beds, bunks, or litters, and as multiple seats. In certain of its aspects the present invention constitutes improvements upon the inventions disclosed and claimed in the copending application of the present applicants, Evans and Nampa, Serial No. 554,203, filed September 15, 1944.

Principal objects of the present invention are to provide constructions of the above type which are extremely simple in construction, economical of manufacture and assembly and light in weight, which are readily convertible as aforesaid and which may be readily installed in and removed from associated structures, such for example as transport aircraft; to provide such constructions utilizing flexible material such as canvas, to provide the seat surface, and embodying improved means to adjust the tension of such material; to provide such constructions wherein the supporting legs for the structure are utilized to control the tension of the seat material; to provide such constructions which, in addition to being readily foldable, are also collapsible in a way which enables the structure as a whole to be rolled into a compact roll; to provide such structures utilizing spaced rails to support the flexible seat material, spreaders to maintain the rails in properly spaced relation and legs to support at least certain of the rails, and further embodying means which enable the spreaders and the legs to be collapsed against associated rails, whereby to permit the aforesaid fold; to provide such constructions embodying seat backs formed of canvas or other flexible material, of a height to support the head as well as the back of an occupant, and embodying improved means to provide a supporting pocket to accommodate the head of the occupant; and to generally improve and simplify the construction and arrangement of constructions of the above generally indicated type.

With the above as well as other and in certain cases, more detailed objects in view, which appear in the following description and appended claims, preferred but illustrative embodiments of the present invention are shown in the accompanying drawings, throughout the several views of which corresponding reference characters are used to designate corresponding parts and in which:

Fig. 2 is a view in perspective of the construction of Fig. 1 with the seat folded back;

Fig. 3 is a view in perspective of the construction of Fig. 1, with the seat in rolled condition;

Fig. 4 is a view in transverse section, taken along the line 4—4 of Fig. 1;

Fig. 5 is a fragmentary enlarged view in transverse section of a detail appearing in Fig. 4;

Fig. 5A is a fragmentary view of a detail of the structure of Fig. 1;

Fig. 6 is a fragmentary view taken in elevation and partly in section, taken along the line 6—6 of Fig. 4;

Fig. 6A is a fragmentary view of a variant of the invention;

Fig. 7 is a fragmentary view in elevation of a modification of the invention;

Fig. 8 is a view in section, taken along the line 8—8 of Fig. 7;

Fig. 9 is a fragmentary view in elevation of an additional embodiment of the invention; and Fig. 10 is a view in section, taken along the line 10—10 of Fig. 9.

Figure 1:
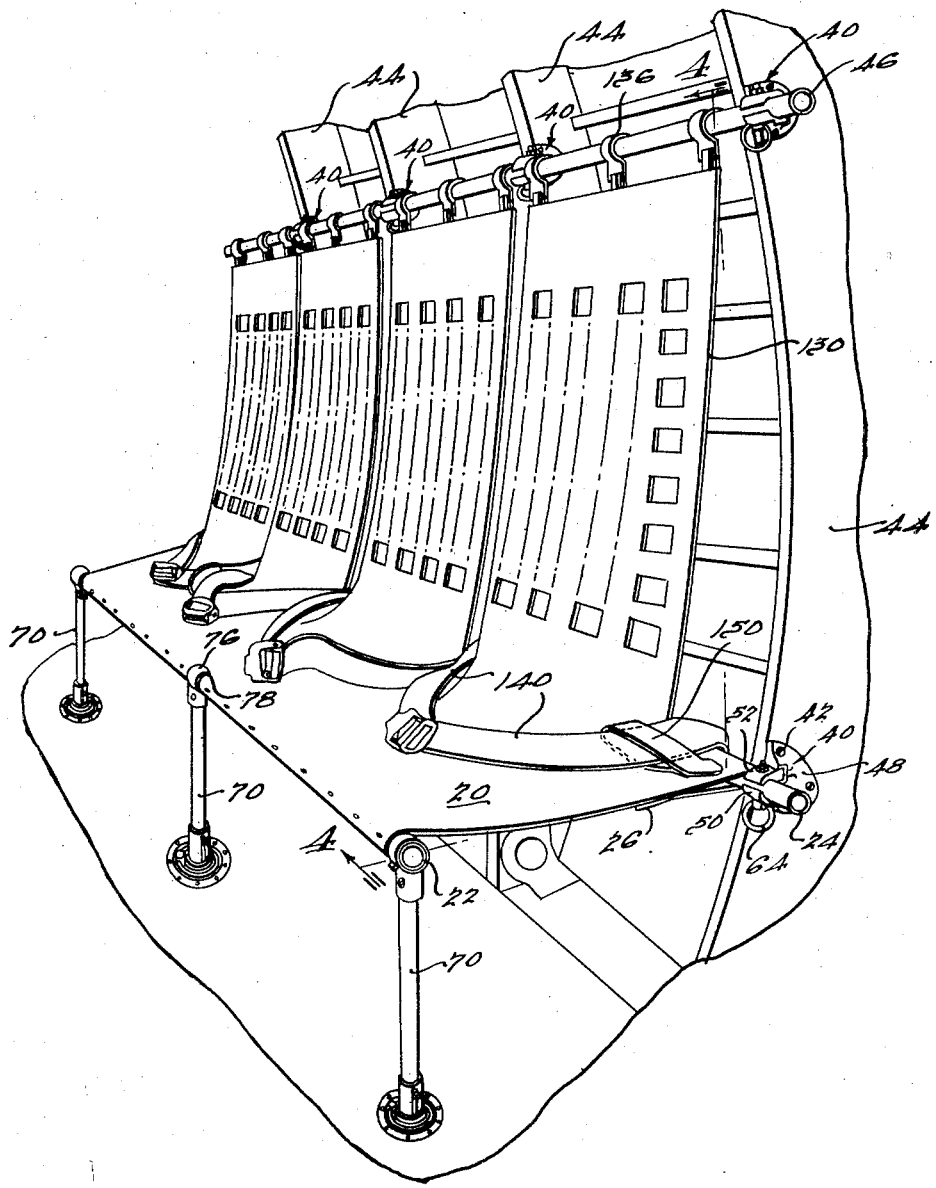
Figure 1 is a view in perspective of an embodiment of the invention, arranged for use as a multiple seat.

It will be appreciated from a complete understanding of the present invention that in a generic sense, the improvements thereof may be embodied in constructions which differ widely from the illustrated construction and which are intended for a wide variety of different uses. Also in a generic sense, certain of these improvements may be utilized independently of others of such improvements. Preferred applications of the invention are in connection with convertible bed and seat structures for use on transport aircraft and in an illustrative but not a limiting sense the invention is so disclosed herein.

Referring first to Figs. 1-6, the general arrangement of the structure is in accordance with the invention of the aforesaid application, Serial No. 554,203, filed September 15, 1944.

More particularly, the structure comprises a seat surface 20 which may be and preferably is formed of flexible material such as relatively heavy canvas, and which is of a length somewhat in excess of the height of the expected occupants so that such surface may be utilized as a bed, bunk, or litter. Surface 20 is supported by the rails 22 and 24, which may be and preferably are formed of relatively light weight tubular metallic stock. As shown, the rear side of surface 20 is connected to the rear rail by looping the material over such rail, and attaching the free edge 26 of the surface 20 to the body thereof by stitching as indicated at 28 in Fig. 4. This arrangement permits rail 24 to be freely rotatable and slidable lengthwise within the loop thus formed.

To provide the tension adjustment hereinafter described, the front edge 30 of the seat 20 is provided with a hem which receives a metallic reinforcing element 32. This hemmed and reinforced edge is fastened securely to the front rail 22 by a plurality of longitudinally spaced fastening elements 34 which pass through the fabric, through the reinforcing element 32 and through the wall of the rail 22. These fastening elements may be for example metallic screws of a well known type which may be screwed into untapped openings provided in element 32 and in rail 22. With this arrangement it will be understood that the tension of the seat surface 20 may be regulated by rotatably adjusting the front rail 22. This adjustment is accomplished as described below.

Preferably and as illustrated, the rear rail 24 is removably secured to a part of the associated structure. More particularly, as shown, the rear rail is carried by brackets 40, which are removably secured, as by screws 42, to the reinforcing ribs 44 which form a structural part of the fuselage of the associated airplane. To give adequate support to the rear rail 24, it is preferred to provide one such bracket 40 for each such rib 44, in the manner indicated in connection with the hereinafter described upper rail 46.

Each bracket 40 comprises a generally flat body portion 48, which accommodates the fastening elements 42, a fixed tongue 49, and upper and lower movable jaws 52 and 50. Each jaw is provided with a concave seat portion 54 to accommodate the rounded surface of the associated rail, and is also provided with a slightly outwardly turned rounded nose 56 to avoid injury to the material 20 in those cases in which the bracket 40 is fitted both over the material and the rail, which relation is indicated in Fig. 5. The jaws are adjustably secured to the tongue 49 of the bracket by a stud 60 which passes therethrough, and an associated nut 62. As shown, the lower end of each stud 60 may conveniently carry a cargo-fastening ring 64.

Further in accordance with the disclosure of the aforesaid application, Serial No. 554,203, the front rail 22 is supported by a plurality of legs 70 which may be and preferably are formed of relatively light weight tubular metallic stock. The upper end of each leg 70 is provided with a fitting 72, secured thereto as by a bolt 74, and which defines a cylindrical sleeve 76. Each sleeve 76 is accommodated by a cutout portion 78 provided therefor in the seat surface 20, and is dimensioned to provide a free rotative fit for the front rail 22. In order to lock each leg 70 in a predetermined rotative position with respect to the rail 22, a clutch connection is provided therebetween. As shown, this clutch connection is afforded by providing a locking screw 80 for each sleeve, which is threaded through the wall thereof and may be turned into locking position relative to the surface of the rail 22.

With this relation it will be appreciated that vertical loads applied to the seat surface 20 tend to rotate the legs 70 in a clockwise direction, about the rail 22, as viewed in Fig. 4. To enable legs 70 to resist this force and to otherwise stabilize their connection to the associated floor structure 82, the legs 70 are provided with associated fittings 84, which enable them to be detachably secured to depressed floor plates 86. As most clearly appears in Fig. 6, and in the aforesaid application Serial No. 554,203, filed September 15, 1944, fittings 84, which telescopically receive the lower ends of the legs 70 are provided with diametrically opposite vertically extending slots 88 which receive latches 90. Latches 90 in turn are provided with hook-like lower ends which engage below the shouldered head 92 of a holding button which is rigidly secured to each corresponding floor plate 86. A compression spring 94 biases the latches into the just-mentioned holding relation but enables a separation of the hooked lower ends in order to make and break the detachable connection.

With the just-mentioned relation, it will be appreciated that the tension of the seat surface 20 may be very readily adjusted by releasing the legs 70 from their associated floor plates 86, affecting a desired rotative adjustment between each leg 70 and the rail 22, as permitted by the aforesaid clutch connection, and thereafter re-engaging the legs 70 with their floor plates.

An important feature of the present invention resides in arranging the structure so that it can be readily rolled to the out of the way position shown in Fig. 3, as well as being folded to the position shown in Fig. 2. As shown, this rolled relation is enabled by arranging the legs 70 so that they can be folded to lie parallel to the front rail 22. More particularly, each leg fitting 72 is of channel form and the upper end of each associated leg 70 is rounded as indicated at 100 in Fig. 6, so that each fastening pin 74 affords a pivotal connection between the related elements 70 and 72. The back 72a of each such channel form limits such pivotal movement in one direction, but enables the legs 70 of Fig. 6, example, to be swung clockwise to a position parallel to and immediately adjacent the rail 26. It is within the purview of the present invention to provide a detent connection between each leg 70 and its fitting, which yieldably resists the just-mentioned movement. As shown in Fig. 6A, such a detent connection may be afforded by inwardly directing the legs 72' of the associated fitting 72" by an amount to lightly resist the above mentioned swinging movement of the legs 70.

Further in accordance with the disclosure of the aforesaid copending application, Serial No. 554,203, the structure is preferably provided with a plurality of longitudinally spaced spreaders 110 which may be and preferably are formed of relatively light weight tubular metallic stock. Spreaders 110 are preferably downwardly bowed, so that they do not interfere with the depressing of the seat surface 20 by occupants lying or sitting thereon.

In accordance with the present invention the front ends of spreaders 110 are provided with fittings 112, which may and preferably do duplicate the fittings 72 or 72" except that they do not require the locking screws 80. Thus, rail 22 is freely rotatable within the sleeves afforded by fittings 112. As is best shown in Fig. 5A, the rear end of each spreader 110 is provided with a rearwardly presenting U-shaped spring clip 114, the marginal edges of the legs of which are slightly outwardly turned as indicated at 116. These clips freely and rotatably embrace the rear rail 24 and yieldably resist a separation of the spreader from the rail in a direction lengthwise of the spreader. The material of the surface 20 is provided with cutout portions 118 to accommodate the just-mentioned fittings, as is indicated at 118 in Fig. 2. It will be understood accordingly that when the seat is in the active position of Figs. 1 and 4, spreaders 110 are enabled to maintain a desired spacing between the front and rear rails 22 and 24. In folding the seat to the position of Fig. 2, the fittings 114 enable the spreaders to pivot about the rear rail 22. In preparing to roll the seat to the position of Fig. 3, the fittings 114 are separated from the rail 24. Sufficient slack in the surface material 20 to accommodate this movement is afforded by releasing the legs 70 from their floor fittings and swinging the lower ends thereof outwardly, as will be understood. When the legs 70 are secured to their floor fittings, insufficient slack is left in the surface material to permit such a separating movement of the fittings 114 from the rear rail 24. The knees or joints 112 in the spreaders 110 permit them to be folded lengthwise against the front rail 22, for rolling purposes, as will be understood. When the spreaders are folded against the rail 22, it will be understood that they overlap each other somewhat. This overlapping is accomplished by turning the spreaders to slightly different rotative positions relative to the rail 22.

Further in accordance with the disclosure of the aforesaid copending application, the present structure may be utilized as a multiple seat and is consequently provided with a plurality of seat backs 130 which may be and preferably are formed of flexible material such as canvas, of a preferably open mesh type. The lower ends of the backs 130 may be and preferably are sewed to the seat surface 20 at a point intermediate the rails 22 and 24. For this purpose, the lower edge of each back 130 is provided with an attaching tab 132 of double thickness, which tab is stitched to material 20 as indicated at 134.

The upper ends of the backs 130 are supported by an upper rail 46 which may correspond to the rail 24 and is similarly secured to the associated ribs 44. Further as shown each back 130 is connected to the rail 46 by a plurality of hooks 136, which may be adjustably connected to the corresponding back by the buckled strap 138 shown in Figure 4. The use of hooks affords a very readily made or separated connection between the backs 130 and the rail 46, as will be understood. As in the case of the copending application, it is preferred to give the backs 130 a height which enables them to support the head as well as the back of the occupant. In certain instances to give a cradled support to the head, it is desirable to provide for depressing the central portion of the upper end of each back. This is readily accomplished by simply releasing the central hook 136. Alternative arrangements for cradling the head of the occupant are shown in Figures 7 through 10, described hereinafter.

As in the case of the copending application, it is preferred to provide the individual seats with usual safety belts 140, the rear ends whereof are turned around behind the rail 24 and are sewed to the underside of the surface 20 as indicated in Figure 2. When not in use, it will be understood that the safety belts 140 may be dropped down behind the rail 24, the same being true of the backs 130. In the rolled position of the seat, the belt 140 are disposed within the body of the roll. The backs 130, under these conditions, may either be rolled at the outside or the inside of the roll. The structure may conveniently be retained in rolled position by the spring clips 131 which are secured to the wall structure, and which, when not in use, may be turned to lie flatwise thereagainst.

A feature of the present construction resides in providing each safety belt portion 140 with a retaining loop 150, only one of which is shown in Figure 1, in order to simplify the drawing. This loop insures that when a safety belt portion is withdrawn from its dropped position behind the rail 24, it will nevertheless be snubbed around the rail 24.

In the modification of Figures 7 and 8, the upper portion of a seat back 160 is provided with a slit 162 which defines a generally elliptical opening therein of a size which forms a cradle for the head of the occupant. The base of this cradle is afforded by a flexible panel 164 which is sewed to the seat back 160 behind the slit.

Alternatively, as shown in Figures 9 and 10, each seat back may be provided with a detachable cushion 170 having a depressed central portion 172, which, with the thickened side portions 174 defines a head-receiving cradle. As shown, pillow 170 may be adjustably connected to the rear rail 24 by hooks 176, in the manner described above in connection with hooks 136.

Although only several specific embodiments of the invention have been described in detail, it will be appreciated that various further modifications in the form, number, and arrangement of the parts may be made without departing from the spirit and scope of the invention.

This application is a full continuation of our abandoned application, Serial No. 554,204, filed September 15, 1944, entitled "Combination Seat and Bed."

What is claimed is:

1. In a seat structure or the like, the subcombination of a flexible sheet for providing a seating surface or the like, said sheet having spaced side edges, a rail having a longitudinal axis and rotatable about said axis, a spacer rotatably connected to said rail to permit said rotation of the rail about its longitudinal axis relative to said spacer and adapted to space said rail from a suitable support for the other end of said spacer, said sheet being affixed along one of said edges to said rail and capable upon rotation of said rail about said longitudinal axis of wrapping around said rail, said seat structure including a support member extending radially of said axis and supporting said rail, a connecting means between said rail and member permitting relative movement therebetween around said longitudinal axis, locking means between said rail and support member for selectively releasing or holding said rail and member in any of various angular positions relative to each other for joint rotation about said axis, and means on the support member spaced from said rail whereby the member may be selectively anchored to a suitable fixed member to prevent such joint rotation, the other of said sheet edges and said spacer having means to be connected to a support spaced from said rail by said spacer.

2. The invention as set forth in claim 1 wherein said connecting means also includes pivotal means permitting pivoting of said member about an axis transverse to said longitudinal axis whereby said member may be pivoted about said transverse axis to a position alongside said rail.

3. In a seat structure or the like, the combination of a flexible sheet for providing a seating surface or the like, said sheet having spaced side edges, a first rail having a longitudinal axis and rotatable about said axis, a spacer rotatably connected to said rail, said sheet being affixed along one of said edges to said rail and capable upon rotation of said rail about said longitudinal axis of wrapping around said rail, a second rail, said spacer being connected to the second rail and spacing the first rail from the second, said other edge of said sheet being secured to the second rail, a support member for said first rail extending radially of said axis, a connecting structure pivotally joining said first rail and support member whereby they are capable of relative movement around said longitudinal axis, locking means between said first rail and support member for selectively preventing such relative movement around said axis and for uniting said rail and member in any of various angular positions relative to each other for joint rotation about said axis, and means on the support member spaced from said rail whereby the member may be selectively anchored to a suitable fixed member to selectively prevent such joint rotation.

4. The invention as set forth in claim 3 wherein said support member is pivoted to said connecting structure on an axis transverse to said longitudinal axis whereby said member may be pivoted about said transverse axis to a position alongside said rail.

5. In a seat structure or the like, the combination of a flexible sheet for providing a seating surface or the like, said sheet having spaced side edges, a first rail having a longitudinal axis and rotatable about said axis, means for rotatably supporting said rail, said sheet being affixed along one of said edges to said rail and capable upon rotation of said rail about said longitudinal axis of wrapping around said rail, said other edge of said sheet being adapted to be secured to a second rail mounted in spaced relation to said first rail, said means including a support member for said first rail extending radially of said axis, a connecting structure pivotally joining said first rail and support member whereby they are capable of relative movement around said longitudinal axis, locking means between said first rail and support member for selectively preventing such relative movement around said axis and for uniting said rail and member in any of various angular positions relative to each other for joint rotation about said axis, means on the support member spaced from said rail whereby the member may be selectively anchored to a suitable fixed member to selectively prevent such joint rotation, a spacer bar between said rails to maintain them in spaced relationship, said bar being releasably clamped to said second rail whereby it is separable therefrom, a second connecting structure pivotally joining said first rail and said bar whereby they are capable of relative movement around said longitudinal axis, said support member and said spacer bar being pivoted to their respective connecting structures on axes transverse to said longitudinal axis whereby said member and bar may be pivoted about their respective transverse axes to positions alongside said rail.

6. For a seat structure utilizing a pair of vertically spaced fixed support members located above a floor, the combination of a flexible sheet providing a seating surface, said sheet having spaced side edges, a rail having a longitudinal axis and rotatable about said axis, means for rotatably supporting said rail, said sheet being affixed along one of said edges to said rail and capable upon rotation of said rail about said longitudinal axis of wrapping around said rail, the other of said edges being adapted to be secured to the lower of said support members, said means including a leg to support said rail extending radially of said axis, a connecting structure pivotally joining said rail and leg whereby they are capable of relative movement around said longitudinal axis, locking means between said rail and leg for selectively preventing such relative movement around said axis and for uniting said rail and leg in any of various angular positions relative to each other for joint rotation about said axis, means on the end of said leg opposite said rail for securing it in fixed position on a floor, a flexible sheet providing a back for the seat structure, the lower end of said back sheet being secured to said seat sheet intermediate said side edges and on an axis parallel to said rail axis, means on the upper end of said back sheet adapted to secure it to the upper of said members, and means on the back sheet to adjust its length whereby to adjust the tension in the back sheet, said back sheet being capable of at least partially supporting said seat sheet.

7. For use in an airplane having a floor and a side wall, a seat structure comprising a flexible sheet providing a seating surface, said sheet having spaced front and rear edges, a front rail having a longitudinal axis parallel to said side wall and rotatable about said axis, means for rotatably supporting said front rail, said sheet being adapted to be secured along its rear edge to said side wall, said sheet being affixed along its front edge to said rail and capable upon rotation of said rail about said axis of wrapping around said rail to tension said sheet between said rail and said side wall, said means including a leg to support said rail extending radially of said axis, a connecting structure pivotally joining said rail and leg whereby they are capable of relative movement around said longitudinal axis, locking means between said rail and leg for selectively preventing such relative movement around said axis and for uniting said rail and leg in any of various angular positions relative to each other for joint rotation about said axis whereby said leg may be used as a lever to wrap said sheet around said rail, means on the end of said leg opposite said rail for securing it in fixed position on said floor, a spacer bar between said rail and wall to maintain them in spaced relationship, said bar being releasably clamped to said wall whereby it is separable therefrom, a second connecting structure pivotally joining said rail and said bar whereby they are capable of relative movement around said longitudinal axis, said leg and said spacer bar being pivoted to their respective connecting structures on axes transverse to said longitudinal axis whereby said leg and bar may be pivoted about their respective transverse axes to positions alongside said rail.

8. In a seat structure, the combination of a leg, a pair of spaced side rails, spacer means positioned to maintain spacing between said rails, one of said rails being rotatably mounted on said leg and rotatably connected to said spacer means, a body supporting structure including a flexible seat portion affixed to said rotatable rail and secured to the other rail and capable of wrapping around said rotatable rail upon rotation thereof and thereby being tensioned between said rails, releasable means for non-rotatably securing the leg to the rotatable rail whereby the leg is swingable therewith about the axis of the rail and may be used as a lever to rotate said rail and tension said seat portion, means to secure said leg in its tensioning position, said body supporting structure including a back portion extending upwardly from the seat portion at a location intermediate said rails, means on said back portion for connection to a support and for adjusting the tension in the back portion, said back portion at least partially supporting said seat portion when connected by said means whereby tension adjustment of the back by said means also affects the tension in said seat portion.

9. For use in an airplane having a floor and side wall, a light weight troop type seat structure adapted to be removable and also to be foldably collapsible and rolled up and which in its operative position comprises a flexible sheet means extending horizontally and providing a body supporting surface and having spaced apart side edges, an elongated member secured along one of said edges, the other of said edges having means to removably secure it to suitable means on the side wall of the airplane, spacer means acting between said elongated member and said airplane side wall to space them and having means to removably connect it to said side wall leg means, said spacer means and leg means being both hingedly connected to said elongated member to selectively swing to inoperative positions alongside of said elongated member whereby said hingedly connected members are adapted to be folded-up alongside said elongated member and rolled up in this connected collapsed condition in said connected flexible sheet and removed from the said side wall.

10. The invention as set forth in claim 9 in which said body supporting sheet includes a seat forming portion and also a back forming portion connected thereto intermediate said spaced side edges and both of which connected sheet portions may be wrapped around said collapsed and connected members as a core.

11. For use in an airplane having a floor and side wall, a light weight seat structure upwardly swingable to fold up in place and also removable as a roll wrapped collapsed assembly, said seat structure comprising an elongated front rail member having a longitudinal axis, a seat forming flexible sheet portion having two spaced apart edges, one of said edges being secured to and along said rail and the other of said edges having means to detachably and hingedly connect it to suitable lower support means on the airplane side wall, a back forming flexible seat portion extending upwardly from the seat forming portion intermediate its spaced edges and in normal use partially supporting said seat portion, means to detachably secure the upper end of said back portion to suitable upper support means on the airplane side wall, spacer members connected to said front rail and having means to hingedly and removably engage suitable lower support means on the airplane side wall to space said front rail from said lower support means, and legs, connected to said front rail to support it in operative position, the connections of both said spacer members and legs to said front rail permitting motion about two different axes whereby both said spacer members and said legs can be selectively folded to connected inoperative positions alongside of said rail and also for selective swingable movement about the said longitudinal axis of said rail, and whereby the said seat structure may be folded up while connected to and carried by the side wall by swinging the legs to a position alongside of the spacers and seat portion and swinging the spacers and seat portion with the legs upwardly about the suitable lower means on the side wall to a position alongside of the back portion and whereby the seat structure may alternatively be collapsed by detaching the spacer members from the side wall and folding up the spacer members and legs to said positions alongside of said front rail and rolling up this connected assembly in said flexible seat and back portions disconnected from said side wall to form a removable roll wrapped up package.

12. The invention as set forth in claim 11 including means to adjustably rotate the front rail about its longitudinal axis to roll up and wrap the flexible seat forming sheet portion about only the said rail to adjust its tension between the said front rail and its connection to the said wall, and means to retain said rotary adjusted position of the rail to retain the thus adjusted tension of the seat forming flexible portion.

ROBERT B. EVANS.
SULO MICHAEL NAMPA.
MILTON R. FETTERLY.

REFERENCES CITED

The following references are of record in the file of this patent:

UNITED STATES PATENTS

| Number | Name | Date |
|---|---|---|
| 542,374 | Sauerbier | July 9, 1895 |
| 648,453 | Daley | May 1, 1900 |
| 671,297 | Russell | Apr. 2, 1901 |
| 710,304 | Rose et al. | Sept. 30, 1902 |
| 1,068,508 | Lee | July 29, 1913 |
| 1,607,572 | Soderquist | Nov. 16, 1926 |